(12) United States Patent
Shin et al.

(10) Patent No.: US 7,915,614 B2
(45) Date of Patent: Mar. 29, 2011

(54) DISPLAY SUBSTRATE HAVING THE SAME AND METHOD OF MANUFACTURING THE DISPLAY SUBSTRATE

(75) Inventors: Kyoung-Ju Shin, Hwaseong-si (KR); Jang-Soo Kim, Yongin-si (KR); Chong-Chul Chai, Seoul (KR)

(73) Assignee: Samsung Electronics Co., Ltd. (KR)

( * ) Notice: Subject to any disclaimer, the term of this patent is extended or adjusted under 35 U.S.C. 154(b) by 481 days.

(21) Appl. No.: 12/027,102

(22) Filed: Feb. 6, 2008

(65) Prior Publication Data

US 2008/0185589 A1 Aug. 7, 2008

(30) Foreign Application Priority Data

Feb. 7, 2007 (KR) .................. 10-2007-0012501

(51) Int. Cl.
*H01L 33/38* (2010.01)
(52) U.S. Cl. ............... 257/59; 257/72; 257/532; 257/98; 257/E33.062; 257/E21.008; 438/30; 438/90
(58) Field of Classification Search ............. 257/59, 257/E21.002, E29.273, 72, 532, 98, E33.062, 257/E21.008
See application file for complete search history.

(56) References Cited

U.S. PATENT DOCUMENTS

| | | | | |
|---|---|---|---|---|
| 5,994,721 A * | 11/1999 | Zhong et al. | .................. | 257/89 |
| 2004/0070698 A1 | 4/2004 | Choi et al. | | |
| 2004/0125248 A1* | 7/2004 | Song | .................. | 349/38 |
| 2006/0001825 A1* | 1/2006 | Choi et al. | .................. | 349/156 |
| 2006/0006385 A1 | 1/2006 | Park | | |
| 2007/0020825 A1 | 1/2007 | Cho et al. | | |

OTHER PUBLICATIONS

European Search Report corresponding to EP 08002089.4 dated Jun. 11, 2008, 13 pages.

* cited by examiner

*Primary Examiner* — Ngan Ngo
*Assistant Examiner* — Benjamin Tzu-Hung Liu
(74) *Attorney, Agent, or Firm* — Innovation Counsel LLP

(57) ABSTRACT

A display substrate includes a thin-film transistor (TFT) layer, a color filter layer and a pixel electrode formed on a substrate. The TFT layer includes a gate line, a data line electrically insulated from the gate line and extending in a direction different from the gate line, a TFT electrically connected to the gate line and the data line, and a storage electrode formed from the same layer as the gate line in each pixel. The color filter layer includes a storage hole extending to a portion of the TFT layer corresponding to the storage electrode. The storage hole has a horizontal cross-sectional area greater than the storage electrode, wherein the horizontal cross-sectional area is measured in a plane parallel to the substrate. The pixel electrode is formed on the color filter layer and in the storage hole to form a storage capacitor with the storage electrode.

25 Claims, 9 Drawing Sheets

111 120 160 170 SE 140 SEH 130 150

DISPLAY SUBSTRATE HAVING THE SAME AND METHOD OF MANUFACTURING THE DISPLAY SUBSTRATE

CROSS-REFERENCE TO RELATED APPLICATIONS

This application claims priority under 35 U.S.C. §119 to Korean Patent Application No. 2007-12501 filed on Feb. 7, 2007 in the Korean Intellectual Property Office (KIPO) the contents of which are herein incorporated by reference in their entirety.

BACKGROUND OF THE INVENTION

1. Field of the Invention

The present invention relates to a display apparatus. More particularly, the present invention relates to a display substrate capable of preventing a color coordinate shift to improve color reproducibility, a display apparatus having the display substrate and a method of manufacturing the display substrate.

2. Description of the Related Art

A liquid crystal display (LCD) apparatus includes a display substrate, a cover substrate positioned on the display substrate and a liquid crystal layer disposed between the display substrate and the cover substrate.

Generally, the display substrate includes a plurality of signal lines to independently drive a plurality of pixels, a plurality of thin-film transistors (TFTs) and a plurality of pixel electrodes. The cover sub strate includes a color filter layer having a red color filter, a green color filter and a blue color filter, and a common electrode on the pixel electrode.

An LCD apparatus that has a color filter on array (COA) structure has been developed. In the LCD apparatus having the COA structure, the color filter layer is formed on the display substrate in order to prevent misalignment between the display substrate and the cover substrate.

However, in the LCD apparatus having the COA structure, color coordinates become lower in a low grayscale region and then rapidly increase in a specific region. Therefore, colors are shifted in the low grayscale region, making it difficult to display a smooth image.

SUMMARY OF THE INVENTION

The present invention provides a display substrate capable of preventing a color coordinate shift to improve color reproducibility. The present invention further provides a display apparatus having the display substrate. The present invention still further provides a method of manufacturing the display substrate.

In one aspect, the invention is a display substrate that includes a substrate, a thin-film transistor (TFT) layer formed on the substrate, a color filter layer and a pixel electrode. The TFT layer includes a gate line, a data line electrically insulated from the gate line by a gate insulating layer, a TFT electrically connected to the gate line and the data line, and a storage electrode formed in each pixel that is defined by the gate line and the data line that extends in a direction different from the gate line. The storage electrode is formed from the same layer as the gate line. The color filter layer includes a storage hole extending to a portion of the TFT layer corresponding to the storage electrode. The storage hole has a horizontal cross-sectional area greater than the storage electrode. The pixel electrode is formed on the color filter layer and in the storage hole over the storage electrode to form a storage capacitor. The gate insulating layer is interposed between the pixel electrode and the storage electrode.

The color filter layer may include a red color filter, a green color filter and a blue color filter formed in each pixel.

The display substrate may further include a light-blocking layer covering an area between an edge portion of the storage hole and an edge portion of the storage electrode.

The display substrate may further include a column spacer formed on the pixel electrode. The column spacer may have a horizontal cross-sectional area greater than the storage hole, and may be formed using a material that blocks light.

In another aspect, the invention is a display apparatus that includes the above-described display substrate, a cover substrate and a liquid crystal layer. The cover substrate is positioned substantially parallel to the display substrate and includes a common electrode formed on a surface of the cover substrate that faces the display substrate. The liquid crystal layer is disposed between the display substrate and the cover substrate.

In yet another aspect, the invention is a method of manufacturing a display substrate by providing a substrate and forming a TFT layer thereon. The TFT layer includes a gate line, a data line, a TFT, and a storage electrode. The data line is insulated from the gate line by a gate insulating layer and crosses the gate line. The TFT is connected to the gate line and the data line. The storage electrode is formed through a process for forming the gate lines in each pixel. A color filter layer is formed. The color filter layer includes a storage hole extending to a portion of the TFT layer corresponding to the storage electrode and having a horizontal cross-sectional area greater than the storage electrode, wherein the horizontal cross-sectional area is measured in a plane parallel to the substrate. The method further entails forming a pixel electrode. The pixel electrode is formed on the color filter layer and in the storage hole, and overlaps the storage electrode. The gate insulating layer is interposed between the pixel electrode and the storage electrode. Therefore, a storage capacitor is formed by the pixel electrode, the storage electrode and the gate insulating layer.

The color filter layer may be formed by forming a red color filter, a green color filter and a blue color filter. The red color filter, the green color filter and the blue color filter are formed using masks having substantially the same design.

According to the display substrate, the display apparatus and the method of the present invention, color coordinates may not be shifted in a low grayscale. Thus, colors may not be changed in the low grayscale.

BRIEF DESCRIPTION OF THE DRAWINGS

The above and other features and advantages of the present invention will become more apparent by describing in detailed embodiments thereof with reference to the accompanying drawings, in which.

DESCRIPTION OF THE EMBODIMENTS

Figure 1:
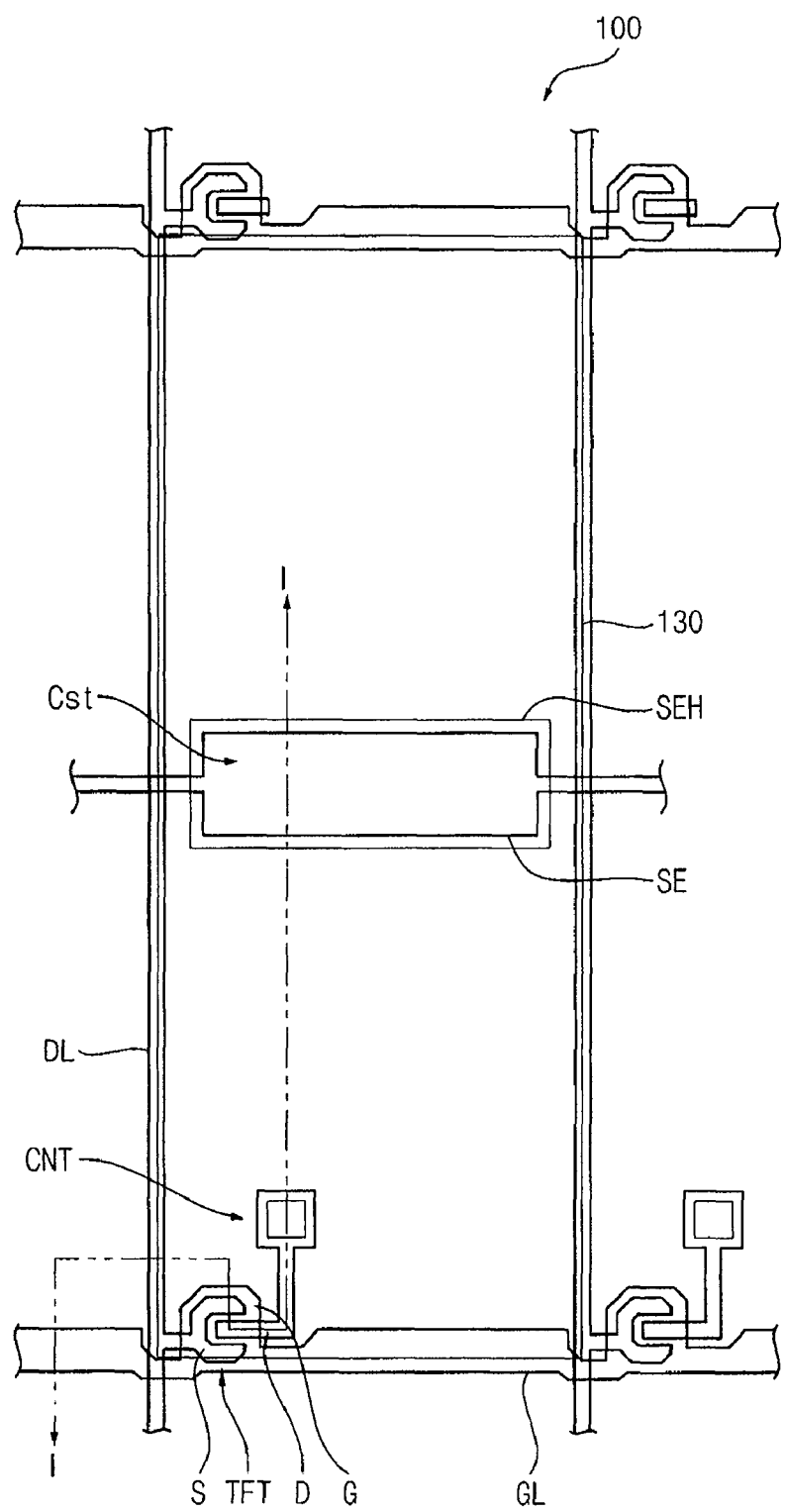
FIG. 1 is a plan view illustrating a display substrate according to a first embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
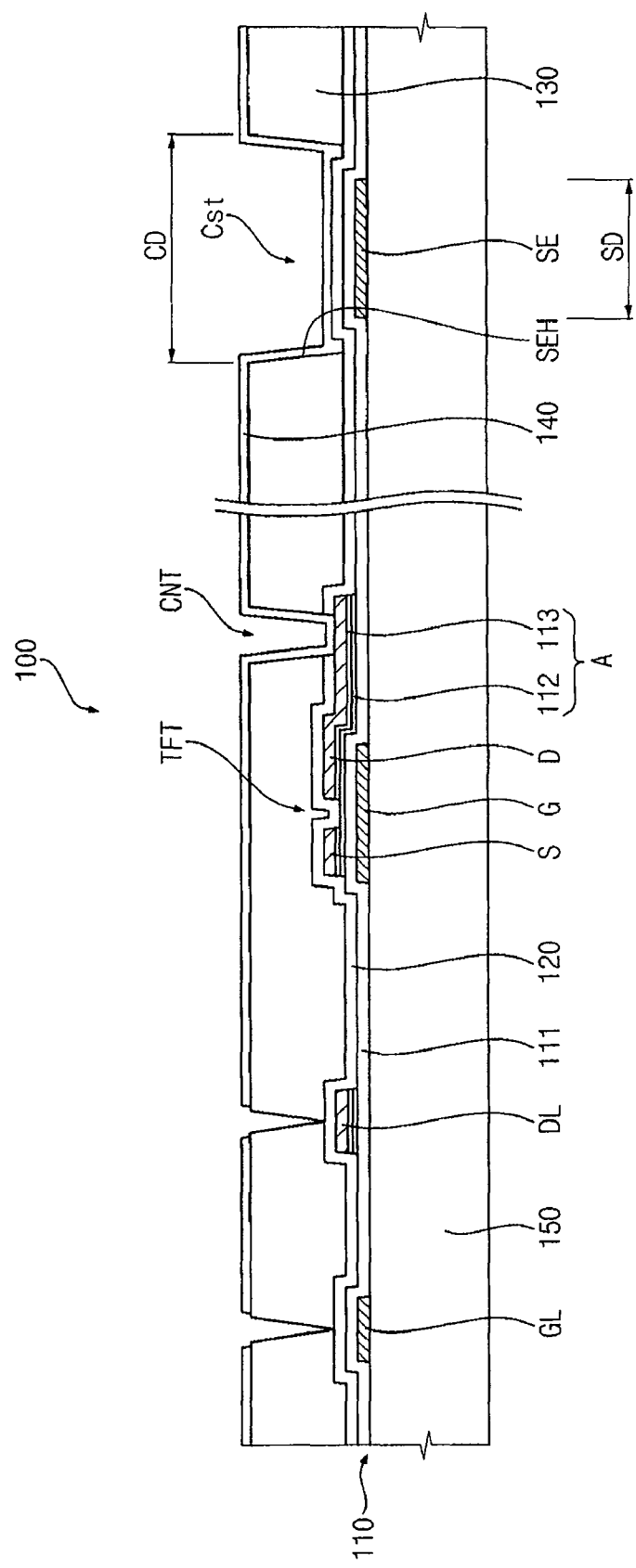
FIG. 2 is a cross-sectional view taken along a line I-I' in FIG. 1.

FIG. 1 is a plan view illustrating a display substrate 100 according to a first embodiment of the present invention. FIG. 2 is a cross-sectional view taken along a line I-I' in FIG. 1.

Referring to FIGS. 1 and 2, the display substrate 100 includes a thin-film transistor (TFT) layer 110, a passivation layer 120, a color filter layer 130, and a pixel electrode 140.

The TFT layer 110 is formed on a transparent insulation substrate 150. The transparent insulation substrate 150 may include glass or plastic.

The TFT layer 110 includes gate lines GL, data lines DL, a TFT, and storage electrodes SE. The data lines DL extend in a direction different from the direction in which the gate lines GL extend. A gate insulating layer 111 insulates the data lines DL from the gate lines GL. A TFT is electrically connected to each of the gate lines GL and each of the data lines DL. The storage electrodes SE are formed from the same layer as the gate lines GL in a pixel region.

The gate lines GL are formed on the insulation substrate 150. For example, the gate lines GL may extend in a first direction and define an upper boundary and a lower boundary for each pixel.

The gate insulating layer 111 is formed on the insulation substrate 150 having the gate lines GL formed thereon. The gate insulation layer 111 protects the gate lines GL and the storage electrodes SE, and electrically insulates the gate lines GL and the storage electrodes SE. Examples of insulating materials that can be used for the gate insulating layer 111 include silicon nitride (SiNx), silicon oxide (SiOx), etc. These can be used alone or in combination.

The data lines DL are formed on the gate insulating layer 111. The data lines DL are insulated from the gate lines GL by the gate insulating layer 111. For example, the data lines DL may extend in a second direction substantially perpendicular to the first direction, and define a right boundary and a left boundary of each pixel.

The TFT is electrically connected to the gate lines GL and the data lines DL. At least one TFT is formed in each pixel. The TFT receives a data voltage from the data lines DL and applies the data voltage to a pixel electrode 140 in response to a gate voltage applied from the gate lines GL.

The TFT may include a gate electrode G, an active pattern A, a source electrode S, and a drain electrode D.

The gate electrode G, which is a gate terminal of the TFT, is electrically connected to the gate lines GL.

The active pattern A is formed on the gate insulating layer 111 corresponding to a position above where the gate electrode G is formed. The active pattern A may include a semiconductor layer 112 and an ohmic contact layer 113. For example, the semiconductor layer 112 may be formed using amorphous silicon (a-Si), and the ohmic contact layer 113 may be formed using n+ amorphous silicon that is formed by implanting n-type impurities at a high concentration (n+ a-Si).

The source electrode S is formed on the active pattern A. The source electrode S, which is a source terminal of the TFT, is electrically connected to the data lines DL.

The drain electrode D is formed on the active pattern A and spaced apart from the source electrode S. The drain electrode D is a drain terminal of the TFT. The drain electrode D is electrically connected to the pixel electrode 140 through a contact hole CNT passing through the passivation layer 120 and the color filter layer 130.

The data lines DL, the source electrode S, the drain electrode D, and the active pattern A are etched by using the same etching mask. Thus, the outline of the active pattern A matches an outline of the data lines DL, the source electrode S and the drain electrode D in plan view.

The storage electrode SE is formed from the same layer as the gate lines GL. Thus, the storage electrode SE is formed using the same material as the gate lines GL. In one embodiment, the storage electrode SE is formed between two gate lines GL and extends in a direction substantially parallel to the gate lines GL.

The gate insulating layer 111 and the passivation layer 120 are formed between the storage electrode SE and the pixel electrode 140. Thus, the storage electrode SE, the gate insulating layer 111, the passivation layer 120, and the pixel electrode 140 form a storage capacitor Cst. A common voltage Vcom may be applied to the storage electrode SE, and the storage capacitor Cst may maintain the data voltage applied to the pixel electrode 140 through the TFT during a frame.

The passivation layer 120 is formed on the TFT layer 110 including the gate lines GL, the data lines DL, the TFT and the storage electrode SE. The passivation layer 120 protects the TFT and electrically insulates the TFT. Examples of an insulating material that can be used for the passivation layer 120 include silicon nitride (SiNx), silicon oxide (SiOx), etc. These can be used alone or in combination.

The color filter layer 130 is formed on the passivation layer 120. The color filter layer 130 may include a photosensitive organic composition having a pigment for displaying a color image. For example, the color filter layer 130 may include a red color filter, a green color filter and a blue color filter. The red color filter includes a photosensitive organic composition having a red pigment for displaying red color. The green color filter includes a photosensitive organic composition having a green pigment for displaying green color. The blue color filter includes a photosensitive organic composition having a blue pigment for displaying blue color. The red color filter, the green color filter and the blue color filter are arranged on the passivation layer 120 in a predetermined pattern. For example, the red color filter, the green color filter and the blue color filter may be alternately arranged in the first direction or the second direction substantially perpendicular to the first direction so that there are three color filters in each of the pixels.

The thickness of the color filter layer 130 may be increased to planarize the display substrate 100. For example, the color filter layer 130 may have a thickness of about 2.5 μm to about 3.5 μm. When the color filter layer 130 is formed not as part of a cover substrate but as part of a display substrate, an organic insulating layer which has been formed as part of a conventional display substrate for planarizing the conventional display substrate may be omitted. Thus, light transmissivity may be enhanced and costs for manufacturing the display substrate may be reduced.

In order to increase the electrostatic capacity of the storage capacitor Cst, the color filter layer 130 includes a storage hole SEH which is formed at a position corresponding to the storage electrode SE. The storage hole SEH has a horizontal cross-sectional area greater than the top surface area of the storage electrode SE so it reduces the differences between the capacitances of the red color filter, the green color filter and the blue color filter. A "horizontal cross-sectional area," as used herein, refers to the cross-sectional area when the display substrate 100 is sliced in a plane parallel to the insulation substrate 150. In the case of the storage hole SEH, which has a varying cross-sectional area due to the sidewall being inclined, the "horizontal cross-sectional area" refers to the horizontal cross-sectional area of the narrowest portion.

When the color filter layer 130 is formed, the red color filter, the green color filter and the blue color filter are generally formed using the same mask or masks having the same design. In case of FIGS. 1 and 2, materials of the red, green and blue color filters are different from each other, so that a thickness, a dielectric constant, and an opening width CD of the storage hole SEH, etc., of each of the red, green and blue color filters may be different from each other. For example, when a panel size of a liquid crystal display (LCD) apparatus having the display substrate 100 is about 40 inches, the maximum difference in the thicknesses of the red, green and blue color filters may be about 2,000 Å, and the maximum difference in the opening widths of the storage holes among the red, green and blue color filters may be about 3 μm. Also, a dielectric constant of the red, green and blue color filters varies in a range of about 3.3 to about 3.5.

The differences in the thickness, the dielectric constant and the opening width of the storage hole among the red, green and blue color filters change the liquid crystal capacitance Clc, the storage capacitance Cst, and the parasitic capacitance Cgs, all of which may affect electrical characteristics of the pixel. Differences between the kickback voltages Vkb for the red, green and blue color filters are increased by the change in the liquid crystal capacitance Clc, the storage capacitance Cst, and the parasitic capacitance Cgs.

When the LCD apparatus is alternately driven by a signal having a negative polarity and a signal having a positive polarity with reference to the common voltage Vcom, the differences in the kickback voltages Vkb of the red, green and blue color filters change the grayscale voltage. When the differences between the kickback voltages Vkb are increased, the slope of a graph showing the transmissivity as a function of voltage is increased by the differences between the kickback voltages Vkb in a low grayscale region. Thus, even though the same pixel voltage is applied to the red, green and blue color filters, differences between the gamma voltages of a red pixel, a green pixel and a blue pixel remarkably change color coordinates in the low grayscale region.

Variation of the kickback voltage Vkb is mostly caused by a deterioration of the storage capacitance Cst. The storage capacitance Cst is determined by an overlapping area between the storage electrode SE and the pixel electrode 140 in a region in which the storage hole is formed. Thus, differences between the storage capacitances among the red, green and blue pixels are increased, as differences between the opening widths CD among the red, green and blue color filters are increased.

The opening of each of the red, green and blue color filters has a horizontal cross-sectional area greater than the horizontal cross-sectional area of the storage electrode SE, so that an overlapping area between the storage electrode SE and the pixel electrode 140 remains constant. As long as the overlapping area remains constant, there will be no changes to the storage capacitance Cst even if the opening width CD of each of the red, green and blue color filters is changed. When the smallest opening in the red, green and blue color filters has a horizontal cross-sectional area greater than the horizontal cross-sectional area of the storage electrode SE, the opening of each color filter has a horizontal cross-sectional area greater than the horizontal cross-sectional area of the storage electrode SE.

When the opening width CD of each of the red, green and blue color filters is greater than the width SD of storage electrode SE, the horizontal cross-sectional area of the storage hole formed in every pixel is greater than the horizontal cross-sectional area of the storage electrode SE, and the overlapping area between the storage electrode SE and the pixel electrode 140 corresponding to each of the red, green and blue color filters is substantially the same.

When the differences in the storage capacitances Cst of the red, green and blue pixels are decreased, the pixel-to-pixel variation of the kickback voltage Vkb may be decreased and the shifting of color coordinates may be prevented in a low grayscale region. Thus, color reproducibility may be improved.

The pixel electrode 140 is formed on the color filter layer 130 to correspond to each pixel. The pixel electrode 140 is formed using a transparent conductive material to transmit light. Examples of the transparent conductive material that can be used for the pixel electrode 140 include indium zinc oxide (IZO), indium tin oxide (ITO), etc.

The pixel electrode 140 is electrically connected to the drain electrode D through the contact hole CNT extending through the color filter layer 130 and the passivation layer 120. The pixel electrode 140 overlaps the storage electrode SE and the passivation layer 120, and the gate insulating layer 111 is interposed between the pixel electrode 140 and the storage electrode SE. Therefore, the storage capacitor Cst is formed by the pixel electrode 140, the storage electrode SE, the passivation layer 120, and the gate insulating layer 111.

The pixel electrode 140 may have patterned openings that divide each pixel into a plurality of domains in order to enhance the viewing angle of the LCD apparatus. Alternatively, the pixel electrode 140 may be divided into a main electrode and a sub-electrode to which different voltages are applied. When the pixel electrode 140 is divided into the main electrode and the sub-electrode, each pixel may have two TFTs respectively connected to the main electrode and the sub-electrode.

Each pixel electrode 140 is independently formed in each pixel, and thus an opening may be formed between adjacent pixels to partially expose the color filter layer 130. Impurities may enter the liquid crystal layer through the opening that partially exposes the color filter layer 130, contaminating the liquid crystal layer. In order to prevent the impurities from entering the liquid crystal layer, an inorganic insulating layer (not shown) may be formed on the color filter layer.

When the opening of the storage hole SEH has a horizontal cross-sectional area greater than the horizontal cross-sectional area of the storage electrode SE, light may leak through a portion between an edge of the storage hole SEH and an edge of the storage electrode SE. Therefore, the display substrate 100 may further include a light-blocking part that prevents the light from leaking through the portion between the edge of the storage hole SEH and the edge of the storage electrode SE.

Figure 3:
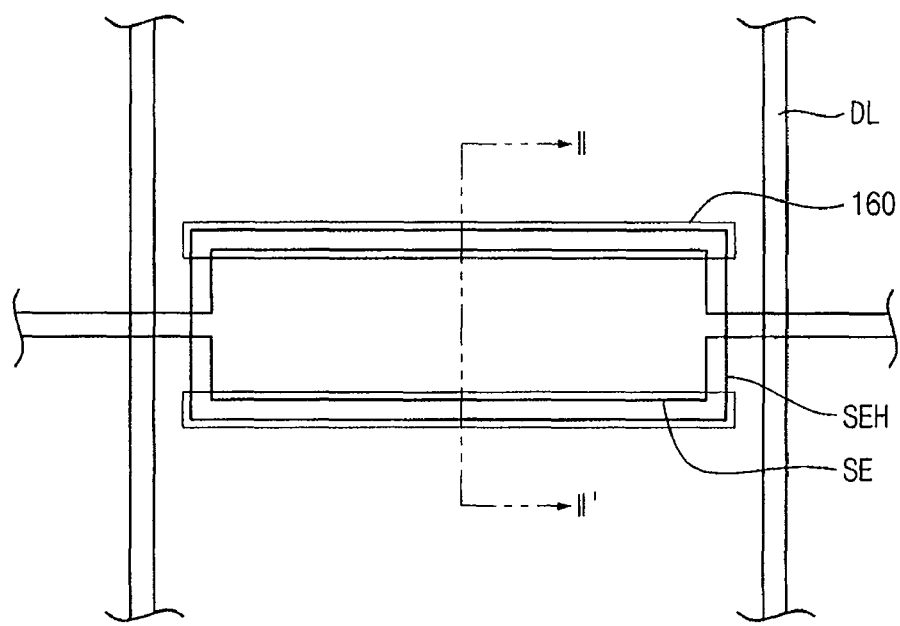
FIG. 3 is a plan view illustrating a display substrate according to a second embodiment of the present invention.
Figure 4:
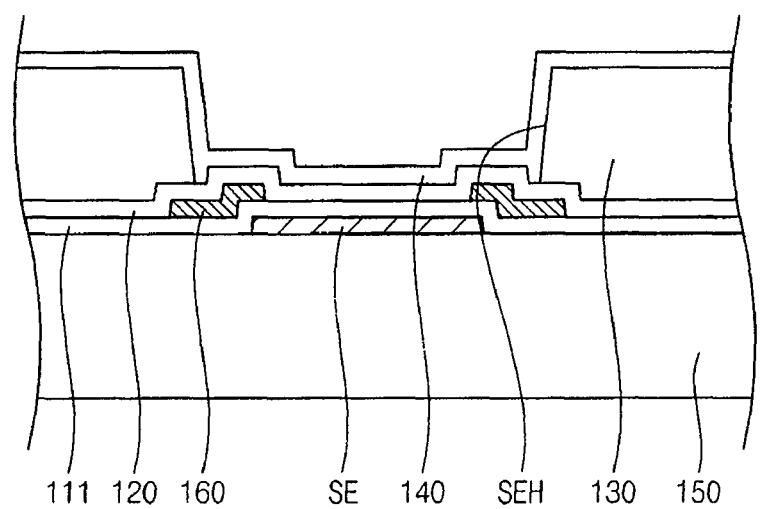
FIG. 4 is a cross-sectional view taken along a line II-II' in FIG. 3.
Figure 5:
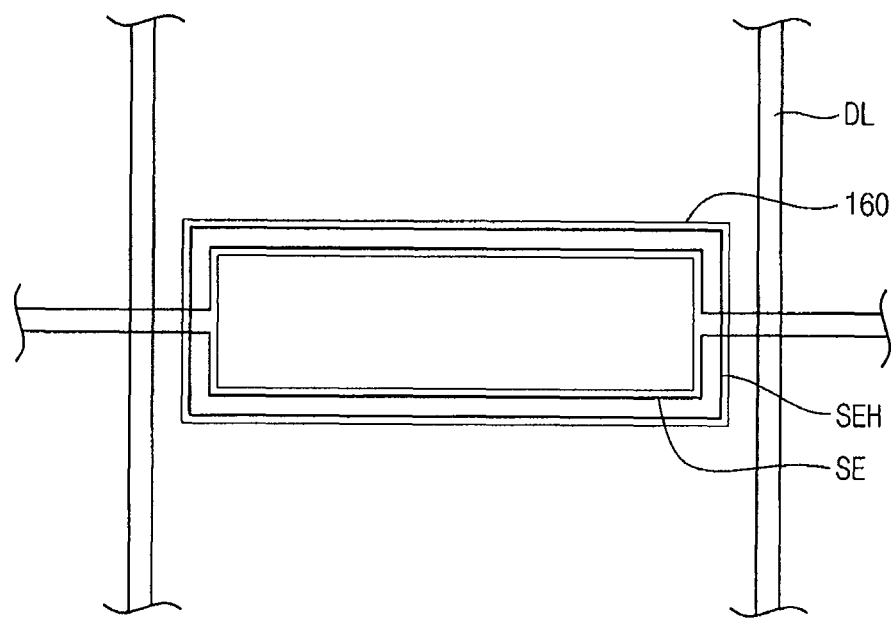
FIG. 5 is a plan view illustrating a light-blocking film according to an embodiment of the present invention.

FIG. 3 is a plan view illustrating a display substrate according to a second embodiment of the present invention. FIG. 4 is a cross-sectional view taken along a line II-II' in FIG. 3. FIG. 5 is a plan view illustrating a light-blocking film according to an embodiment of the present invention.

Referring to FIGS. 3, 4 and 5, the display substrate 100 may include a light-blocking layer 160 that prevents the light from leaking through the portion between the edge of the storage hole SEH and the edge of the storage electrode SE.

The light-blocking layer 160 is formed from the same layer as the data lines DL and is disposed in each pixel. The light-blocking layer 160 covers the portion between the edge of the storage hole SEH and the edge of the storage electrode SE. For example, the light-blocking layer 160 may extend in a direction in which the gate lines GL extend to cover an upper edge and a lower edge of the storage electrode SE. The light-blocking layer 160 may enclose the entire edge of the storage electrode SE as shown in FIG. 5. The light-blocking layer 160 is formed between the edge of the storage hole SEH and the storage electrode SE to prevent the light from a backlight from leaking.

The light-blocking layer 160 is spaced apart from the data lines DL and is electrically insulated from the storage electrode SE by the gate insulating layer 111 to remain floating. Alternatively, the light-blocking layer 160 may be connected to one of the data lines DL that are disposed on either side of the light-blocking layer 160.

Figure 6:
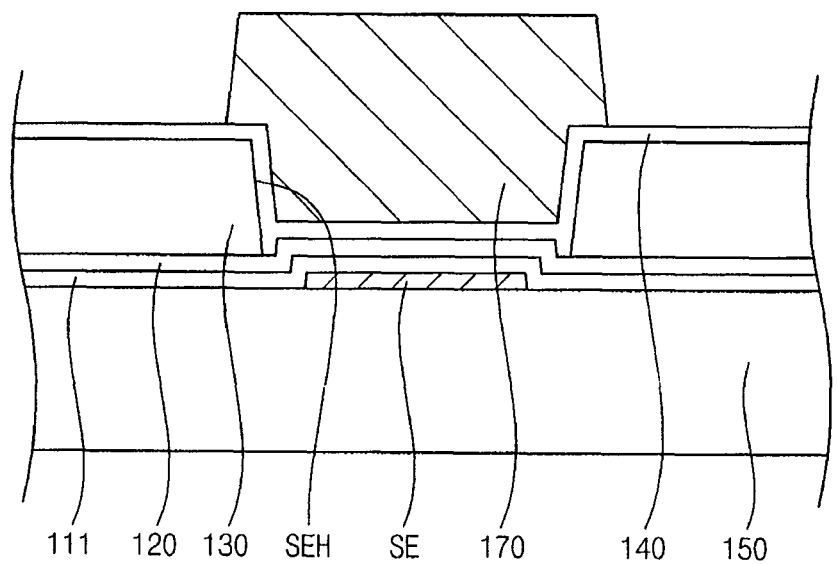
FIG. 6 is a cross-sectional view illustrating a display substrate according to a third embodiment of the present invention.

FIG. 6 is a cross-sectional view illustrating a display substrate according to a third embodiment of the present invention.

Referring to FIG. 6, the display substrate 100 may further include a column spacer 170 formed on the pixel electrode 140. The column spacer 170 maintains a distance between the display substrate 100 and the cover substrate.

The column spacer 170 is formed in a region having the storage hole SEH formed thereon and has a horizontal cross-sectional area greater than the horizontal cross-sectional area of the storage hole SEH to prevent light from leaking through the portion between the edge of storage hole SEH and the edge of the storage electrode SE. The column spacer 170 may be formed using a material that blocks light. For example, the column spacer 170 may be formed using an organic black matrix material.

Figure 7:
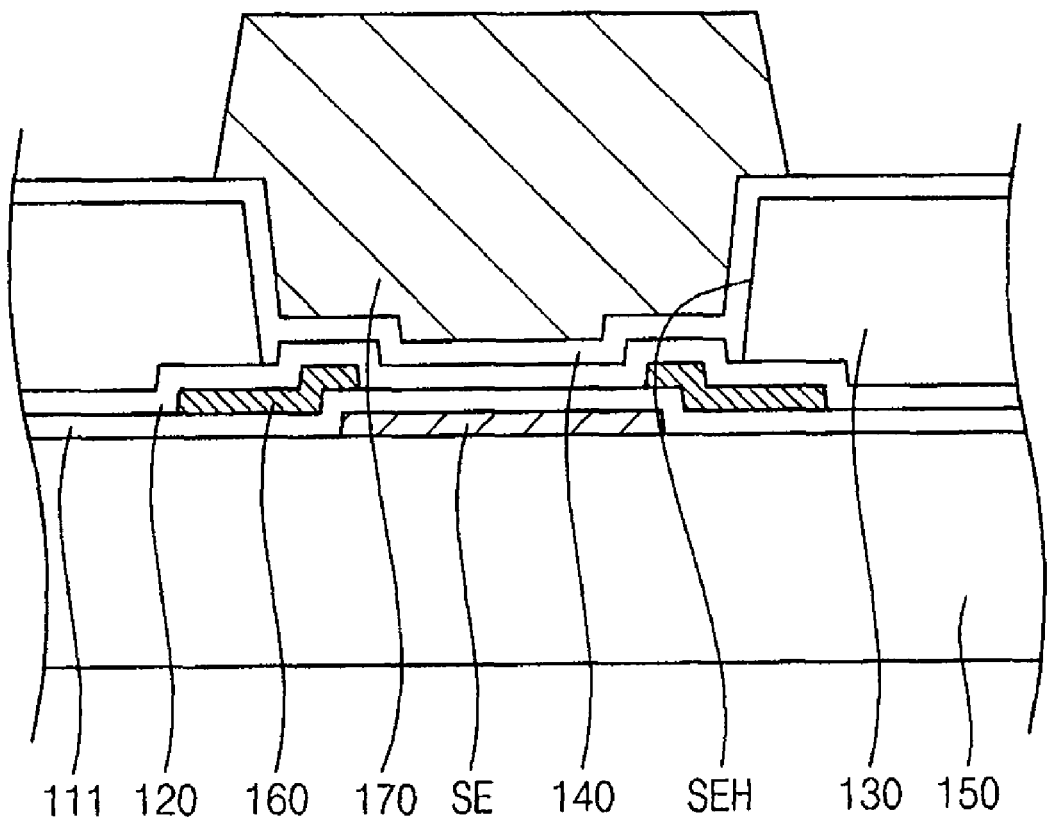
FIG. 7 is a cross-sectional view illustrating a display substrate according to a fourth embodiment of the present invention.

FIG. 7 is a cross-sectional view illustrating a display substrate according to a fourth embodiment of the present invention.

Referring to FIG. 7, the display substrate 100 may include a column spacer 170 and a light-blocking layer 160.

The column spacer 170 is formed in a storage hole SEH and has a horizontal cross-sectional area greater than the horizontal cross-sectional area of the storage hole SEH to prevent light from leaking. The light-blocking layer 160 is formed on an edge of the column spacer 170 through a process for forming the data lines DL to prevent light from leaking.

Hereinafter, a method of manufacturing the display substrate according to another embodiment of the present invention will be described.

Figure 8:
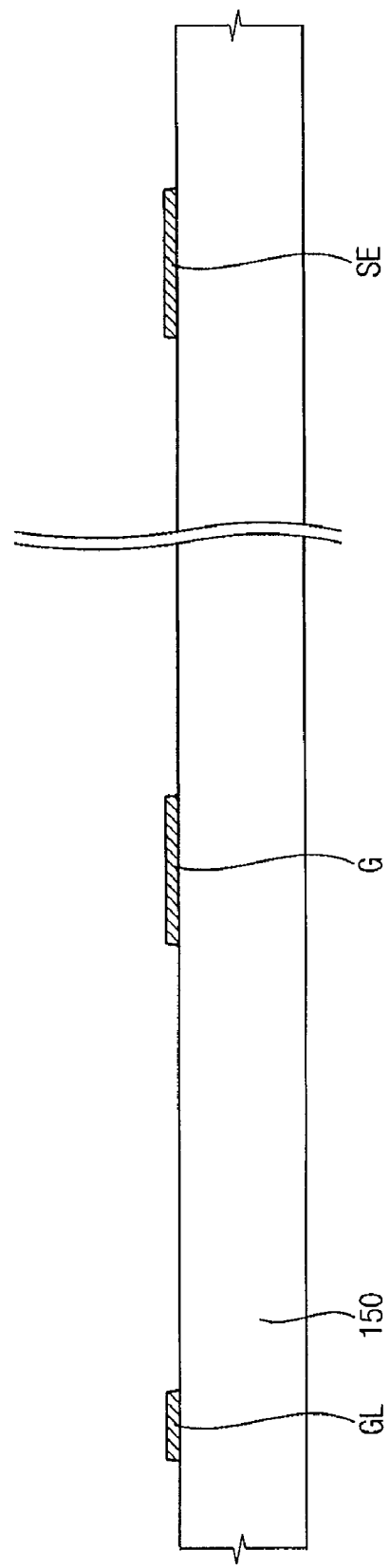
FIGS. 8 to 10 are cross-sectional views illustrating a method of manufacturing a display substrate according to an embodiment of the present invention.
Figure 9:
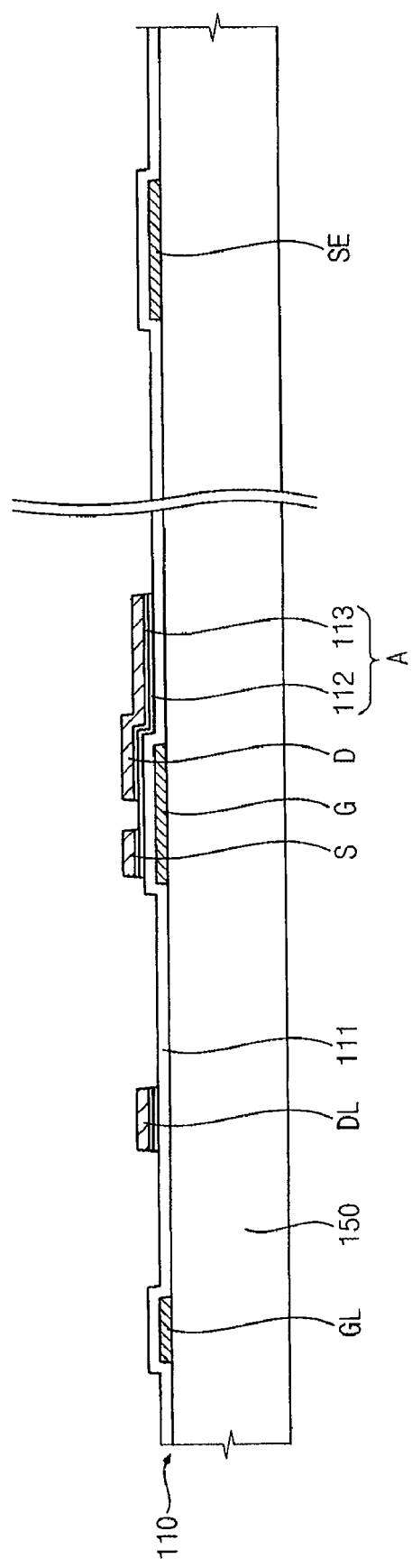
Figure 10:
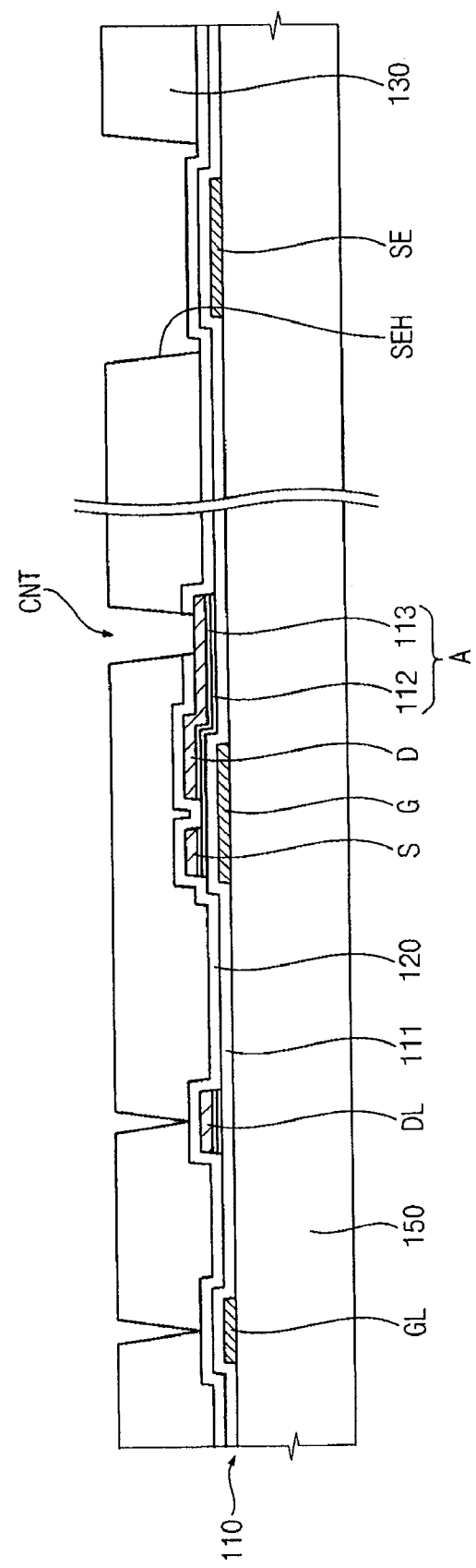

FIGS. 8 to 10 are cross-sectional views illustrating a method of manufacturing a display substrate according to an embodiment of the present invention.

Referring to FIGS. 1 and 8, a gate line GL, a gate electrode G electrically connected to the gate line GL and a storage electrode SE disposed between the gate lines GL are formed on a display substrate 150. The gate line GL, the gate electrode G and the storage electrode SE are simultaneously formed in one photolithography process using a single mask.

Referring to FIGS. 1 and 9, a gate insulating layer 111 is formed on the display substrate 150 having the gate line GL, the gate electrode G and the storage electrode SE formed thereon.

An amorphous silicon (a-Si) layer for forming a semiconductor layer 112, an n+ amorphous silicon (n+ a-Si) layer for forming an ohmic contact layer 113 and a metal layer for data lines are sequentially formed on the gate insulating layer 111. An active pattern A, a data line DL, a source electrode S electrically connected to the data line DL and a drain electrode D spaced apart from the source electrode S are formed through one photolithography process using a slit mask or a halftone mask. The data line DL, the source electrode S, the drain electrode D, and the active pattern A are simultaneously etched through one photolithography process so that the data line DL, the source electrode S and the drain electrode D have substantially the same outline as the active pattern A. Thus, a TFT layer 110 is completed.

As shown in FIGS. 4 and 7, a light-blocking layer 160 that prevents light from leaking through an edge of the storage electrode SE is formed in the same process that forms the data line DL, the source electrode S and the drain electrode D. In some embodiments, the light-blocking layer 160 may be formed from substantially the same layer as the data line DL, the source electrode S and the drain electrode D.

Referring to FIGS. 1 and 10, a passivation layer 120 is formed on the insulating substrate 150 to cover the TFT layer 110.

A color filter layer 130 including a red color filter, a green color filter and a blue color filter is formed on the passivation layer 120. A storage hole corresponding to the storage electrode SE is formed through the color filter layer 130 in order to form a storage capacitor Cst. Also, a contact hole CNT exposing the drain electrode D is formed through the color filter layer 130.

The red, green and blue color filters are regularly arranged on the passivation layer 120 to form a uniform pattern. For example, the red, green and blue color filters may be alternately arranged along the first direction or the second direction so that the color filters correspond to the pixels, respectively.

The red, green and blue color filters are respectively formed in separate photolithography processes. The photolithography processes for forming the red, green and blue color filters, respectively, are performed using the same mask or masks having the same design to decrease manufacturing costs. The red, green and blue color filters include different materials from each other, so that the thickness, the dielectric constant, and the opening area of the storage hole SEH of each of the red, green and blue color filters of the color filter layer 130 may be different from each other.

When an opening that extends through each of the red, green and blue color filters has a horizontal cross-sectional area greater than that of the storage electrode SE, an overlapping area between the storage electrode SE and the pixel electrode 140 remains uniform even if the sizes of the openings that extend through the red, green and blue color filters are different from each other. Accordingly, differences among the storage capacitances Cst according to the red, green and blue color filters may be decreased.

A contact hole CNT extending to the drain electrode D is formed through the passivation layer 120. The contact hole CNT may be formed before the color filter layer 130 is formed.

Referring to FIG. 2, a pixel electrode 140 corresponding to each pixel is is formed on the color filter layer 130. The pixel electrode 140 is electrically connected to the drain electrode D through the contact hole CNT passing through the color filter layer 130 and the passivation layer 120. In addition, the pixel electrode 140 overlaps the storage electrode SE and the passivation layer 120, and the gate insulating layer 111 are interposed between the pixel electrode 140 and the storage electrode SE to form a storage capacitor Cst.

As shown in FIGS. 6 and 7, a column spacer 170 may be formed on the pixel electrode 140 to prevent light from leaking through the edge of the storage electrode SE. The column spacer 170 has a horizontal cross-sectional area greater than that of the storage electrode SE and is formed using an opaque material that blocks light.

Figure 11:
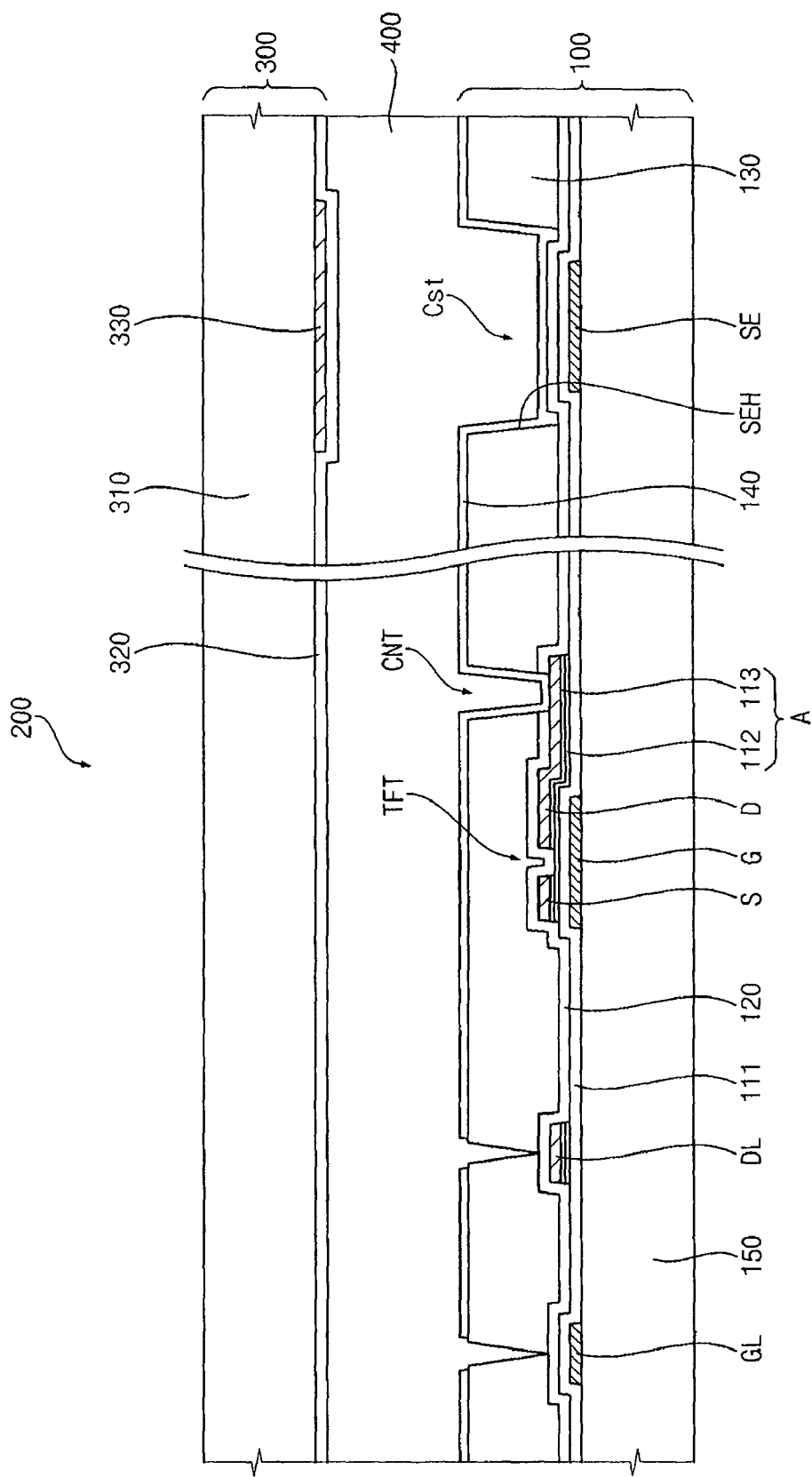
FIG. 11 is a cross-sectional view illustrating a display apparatus according to an embodiment of the present invention.

FIG. 11 is a cross-sectional view illustrating a display apparatus according to an embodiment of the present invention.

Referring to FIG. 11, a display apparatus 200 includes a display substrate 100, a cover substrate 300 positioned substantially parallel to the display substrate 100, and a liquid crystal layer 400 disposed between the display substrate 100 and the cover substrate 300.

The display substrate 100 is substantially the same as the display substrate shown in FIGS. 1 to 7. Thus, any repetitive explanation concerning the display substrate 100 will be omitted.

The cover substrate 300 is positioned substantially parallel to the display substrate 100, and the liquid crystal layer 400 is interposed between the display substrate 100 and the cover substrate 300. The cover substrate 300 includes an insulating substrate 310 and a common electrode 320 formed on an opposing surface of the insulating substrate 310 facing the display substrate 100. The common electrode 320 is formed using a transparent conductive material to transmit light. Examples of the transparent conductive material that can be used for the common electrode 320 include indium zinc oxide (IZO), indium tin oxide (ITO), etc. The common electrode 320 may include patterned openings to enhance the viewing angle.

The cover substrate 300 may further include a black matrix 330. The black matrix 330 is formed in a region corresponding to the storage hole SEH and has a horizontal cross-sectional area greater than the horizontal cross-sectional area of the storage hole SEH. Accordingly, the black matrix 330 may prevent light from leaking through the portion between an edge of the storage hole SEH and an edge of the storage electrode SE. Alternately, the black matrix may be formed on the sides of the pixels.

The liquid crystal layer 400 includes liquid crystal molecules arranged in a predetermined pattern. The liquid crystal molecules have optical and electrical properties of anisotropic refraction, anisotropic dielectric constant, etc. An electrical field between the pixel electrode 140 and the common electrode 320 changes the arrangement of the liquid crystal molecules to control the amount of light passing through the liquid crystal layer 400.

According to the display substrate, the display apparatus having the display substrate, and the method of manufacturing the display substrate described above, an opening of a storage hole formed in red, green and blue color filters has a horizontal cross-sectional area greater than the horizontal cross-sectional area of a storage electrode to minimize the difference among storage capacitors formed in different pixels. As a result, variation in the kickback voltages of the pixels may be decreased and shifting of color coordinates may be prevented in a low grayscale region.

A light-blocking layer is formed between an edge of the storage hole and an edge of the storage electrode and/or a column spacer that has a horizontal cross-sectional area greater than the storage hole. The light-blocking layer is formed using a material that blocks light in the storage hole. Therefore, the light-blocking layer and/or the column spacer may prevent light from leaking.

Having described the exemplary embodiments of the present invention and its advantage, it is noted that various changes, substitutions and alterations can be made herein without departing from the spirit and scope of the invention as defined by appended claims.

What is claimed is:

1. A display substrate comprising:
a substrate;
a thin-film transistor (TFT) layer formed on the substrate, the TFT layer including a gate line, a data line electrically insulated from the gate line by a gate insulating layer and extended in a direction different from the gate line, a TFT electrically connected to the gate line and the data line, and a storage electrode formed in each pixel, wherein the storage electrode is formed from a same layer as the gate line;
a color filter layer including a plurality of storage holes exposing a portion of the TFT layer corresponding to the storage electrode, the storage holes having horizontal cross-sectional areas greater than the storage electrode, wherein the horizontal cross-sectional areas are measured in a plane parallel to the substrate; and
a pixel electrode formed on the color filter layer and in the storage hole over the storage electrode to form a storage capacitor, the gate insulating layer being interposed between the pixel electrode and the storage electrode,
wherein the color filter layer comprises a red color filter, a green color filter and a blue color filter formed in each pixel, and opening widths of the storage holes formed in each of the red, green and blue color filters are different from each other.

2. The display substrate of claim 1, wherein the color filter layer has a thickness of about 2.5 μm to about 3.5 μm and a maximum difference in thicknesses of the red, green and blue color filters is about 2,000 Å.

3. The display substrate of claim 1, the maximum difference in the opening widths of the storage holes among the red, green and blue color filters is about 3 μm, and a dielectric constant of each of the red, green and blue color filters is in a range of about 3.3 to about 3.5.

4. The display substrate of claim 1, further comprising a light-blocking layer covering an area between an edge portion of the storage hole and an edge portion of the storage electrode.

5. The display substrate of claim 4, wherein the light-blocking layer is formed from a same layer as the data line.

6. The display substrate of claim 5, wherein the light-blocking layer is in a floating state.

7. The display substrate of claim 1, further comprising a column spacer formed on the pixel electrode, the column spacer having a horizontal cross-sectional area greater than the storage hole.

8. The display substrate of claim 7, wherein the column spacer is formed using a material that blocks light.

9. The display substrate of claim 8, further comprising a light-blocking layer formed from a same layer as the data line and disposed at an edge portion of the column spacer.

10. A display apparatus comprising:
a display substrate including:
a substrate;
a TFT layer formed on the substrate, the TFT layer including a gate line, a data line electrically insulated from the gate line by a gate insulating layer and extended in a direction different from the gate line, a TFT electrically connected to the gate line and the data line, and a storage electrode formed in each pixel, wherein the storage electrode is formed from a same layer as the gate line;
a color filter layer including a plurality of storage holes exposing a portion of the TFT layer corresponding to the storage electrode, the storage holes having horizontal cross-sectional areas greater than the storage electrode, wherein the cross-sectional areas are measured in a plane parallel to the substrate; and
a pixel electrode formed on the color filter layer and in the storage hole to overlap the storage electrode and form a storage capacitor, the gate insulating layer being interposed between the pixel electrode and the storage electrode;
a cover substrate positioned substantially parallel to the display substrate, the cover substrate including a common electrode formed on a surface of the cover substrate that faces the display substrate; and
a liquid crystal layer disposed between the display substrate and the cover substrate,
wherein the color filter layer comprises a red color filter, a green color filter and a blue color filter formed in each pixel, and opening widths of the storage holes formed in each of the red, green and blue color filters are different from each other.

11. The display apparatus of claim 10, wherein the display substrate further comprises a light-blocking layer that is formed from a same layer as the data line and covers a portion between an edge of the storage hole and an edge of the storage electrode.

12. The display apparatus of claim 10, wherein the display substrate further comprises a column spacer that is formed on the pixel electrode corresponding to the storage hole and has a horizontal cross-sectional area greater than the storage hole.

13. The display apparatus of claim 12, wherein the column spacer is formed using a material that blocks light.

14. The display apparatus of claim 13, wherein the column spacer is formed using a material that blocks light.

15. The display apparatus of claim 13, wherein the display substrate further comprises a light-blocking layer which is formed from a same layer as the data line and is disposed at an edge portion of the column spacer.

16. The display apparatus of claim 12, wherein the display substrate further comprises a light-blocking layer which is formed from a same layer as the data line and is disposed at an edge of the column spacer.

17. The display apparatus of claim 10, wherein the cover substrate further comprises a black matrix that corresponds to the storage hole and has a horizontal cross-sectional area greater than the storage hole.

18. The display apparatus of claim 17, wherein the display substrate further comprises a light-blocking layer that is formed from a same layer as the data line and corresponds to an edge portion of the black matrix.

19. The display apparatus of claim 17, wherein the display substrate further comprises a column spacer that is formed on the pixel electrode corresponding to the storage hole and has a horizontal cross-sectional area greater than the storage hole.

20. A method of manufacturing a display substrate, comprising:
providing a substrate;
forming a TFT layer on the substrate, the TFT layer including a gate line, a data line electrically insulated from the gate line by a gate insulating layer, a TFT electrically connected to the gate line and the data line, and a storage electrode formed from a same layer as the gate lines in each pixel, the data line extending in a direction different from the gate line;
forming a color filter layer including a plurality of storage holes exposing a portion of the TFT layer corresponding to the storage electrode, the storage holes having horizontal cross-sectional areas greater than the storage electrode, wherein the horizontal cross-sectional areas are measured in a plane parallel to the substrate; and
forming a pixel electrode on the color filter layer and in the storage hole, the pixel electrode overlapping the storage electrode to form a storage capacitor, the gate insulating layer being interposed between the pixel electrode and the storage electrode,
wherein the color filter layer comprises a red color filter, a green color filter and a blue color filter formed in each pixel, and opening widths of the storage holes formed in each of the red, green and blue color filters are different from each other.

21. The method of claim 20, wherein the red color filter, the green color filter and the blue color filter are formed using masks having a same design.

22. The method of claim 20, wherein the TFT layer further comprises a light-blocking layer which is formed from a same layer as the data line and covers a portion between an edge of the storage hole and an edge of the storage electrode.

23. The method of claim 20, further comprising forming a column spacer which is formed on the pixel electrode corresponding to the storage hole and has a horizontal cross-sectional area greater than the storage hole.

24. The method of claim 23, wherein forming the column spacer comprises using a material that blocks light.

25. The method of claim 24, further comprising forming a light-blocking layer from a same layer as the data line, the light-blocking layer being disposed at an end portion of the column spacer.

* * * * *